United States Patent [19]
Lan

[11] Patent Number: 6,045,145
[45] Date of Patent: Apr. 4, 2000

[54] STROLLER WITH DETACHABLE AUXILIARY SEAT

[76] Inventor: Red Lan, 15F, No. 108, Sec. 1, Hsin-Tai 5th Rd., Hsichic Chen, Taipei Hsien, Taiwan

[21] Appl. No.: 09/356,545

[22] Filed: Jul. 19, 1999

[51] Int. Cl.⁷ .................................................... B62B 3/02
[52] U.S. Cl. ..................... 280/47.38; 280/642; 280/658; 280/47.35; 280/47.41
[58] Field of Search .................................... 280/638, 639, 280/38, 641, 642, 647, 649, 650, 651, 654, 655, 655.1, 47.35, 47.38, 47.4, 47.41, 657, 658

[56] References Cited

U.S. PATENT DOCUMENTS

| | | | |
|---|---|---|---|
| 4,657,269 | 4/1957 | Elvin | 280/47.28 |
| 4,836,573 | 6/1989 | Gebhard | 280/47.38 |
| 5,184,835 | 2/1993 | Huang | 280/47.38 |
| 5,338,096 | 8/1994 | Huang | 280/47.38 |
| 5,664,795 | 9/1997 | Huang | 280/47.38 |
| 5,911,432 | 6/1999 | Song | 280/47.38 |

*Primary Examiner*—Richard M. Camby
*Attorney, Agent, or Firm*—Brinks Hofer Gilson & Lione

[57] ABSTRACT

A stroller includes a main frame, an auxiliary seat unit, a mounting unit, and a hooking unit. The main frame includes a first seat portion, a pair of front leg portions, and a pair of rear leg portions. The front and rear leg portions are disposed adjacent to lateral sides of the first seat portion, and are mounted to the first seat portion. The auxiliary seat unit includes an auxiliary frame and a second seat portion mounted on the auxiliary frame. The mounting unit mounts detachably the auxiliary frame on the main frame in front of the first seat portion, and includes a locking seat provided on one of the main frame and the auxiliary frame, and an insert member provided on the other one of the main frame and the auxiliary frame. The locking seat is formed with an insert hole which permits insertion of the insert member thereinto for engaging releasably the insert member. The hooking unit includes a support provided on the main frame, and a hook provided on the auxiliary frame for hooking at the support such that the auxiliary frame can be hooked on the main frame in order to support the auxiliary seat unit when the insert member engages the locking seat.

10 Claims, 6 Drawing Sheets

STROLLER WITH DETACHABLE AUXILIARY SEAT

BACKGROUND OF THE INVENTION

1. Field of the Invention

The invention relates to a stroller, more particularly to a stroller which can be installed with an additional seat in a quick and simple manner.

2. Description of the Related Art

A conventional single seat stroller permits only one baby to be seated thereon. Although twin-seat strollers are known in the art, they generally have a relatively large size, and are thus difficult to control during use and inconvenient to store after use. Moreover, when only one baby is seated on the twin-seat stroller, the size of the stroller cannot be reduced as desired.

SUMMARY OF THE INVENTION

Therefore, the main object of the present invention is to provide a stroller which can be installed with an additional seat in a simple and quick manner.

Accordingly, the stroller of the present invention includes a main frame, an auxiliary seat unit, a mounting unit, and a hooking unit. The main frame includes a first seat portion with two lateral sides, a parallel pair of forwardly and downwardly extending wheeled front leg portions, and a parallel pair of rearwardly and downwardly extending wheeled rear leg portions. The front and rear leg portions are disposed adjacent to the lateral sides of the first seat portion, and are mounted to the first seat portion. The auxiliary seat unit includes an auxiliary frame and a second seat portion mounted on the auxiliary frame. The mounting unit mounts detachably the auxiliary frame on the main frame in front of the first seat portion, and includes a locking seat provided on one of the main frame and the auxiliary frame, and an insert member provided on the other one of the main frame and the auxiliary frame. The locking seat is formed with an insert hole which permits insertion of the insert member thereinto for engaging releasably the insert member. The hooking unit includes a support provided on the main frame, and a hook provided on the auxiliary frame for hooking at the support such that the auxiliary frame can be hooked on the main frame in order to support the auxiliary seat unit when the insert member engages the locking seat.

BRIEF DESCRIPTION OF THE DRAWINGS

Other features and advantages of the present invention will become apparent in the following detailed description of the preferred embodiment with reference to the accompanying drawings, of which.

DETAILED DESCRIPTION OF THE PREFERRED EMBODIMENT

Figure 1:
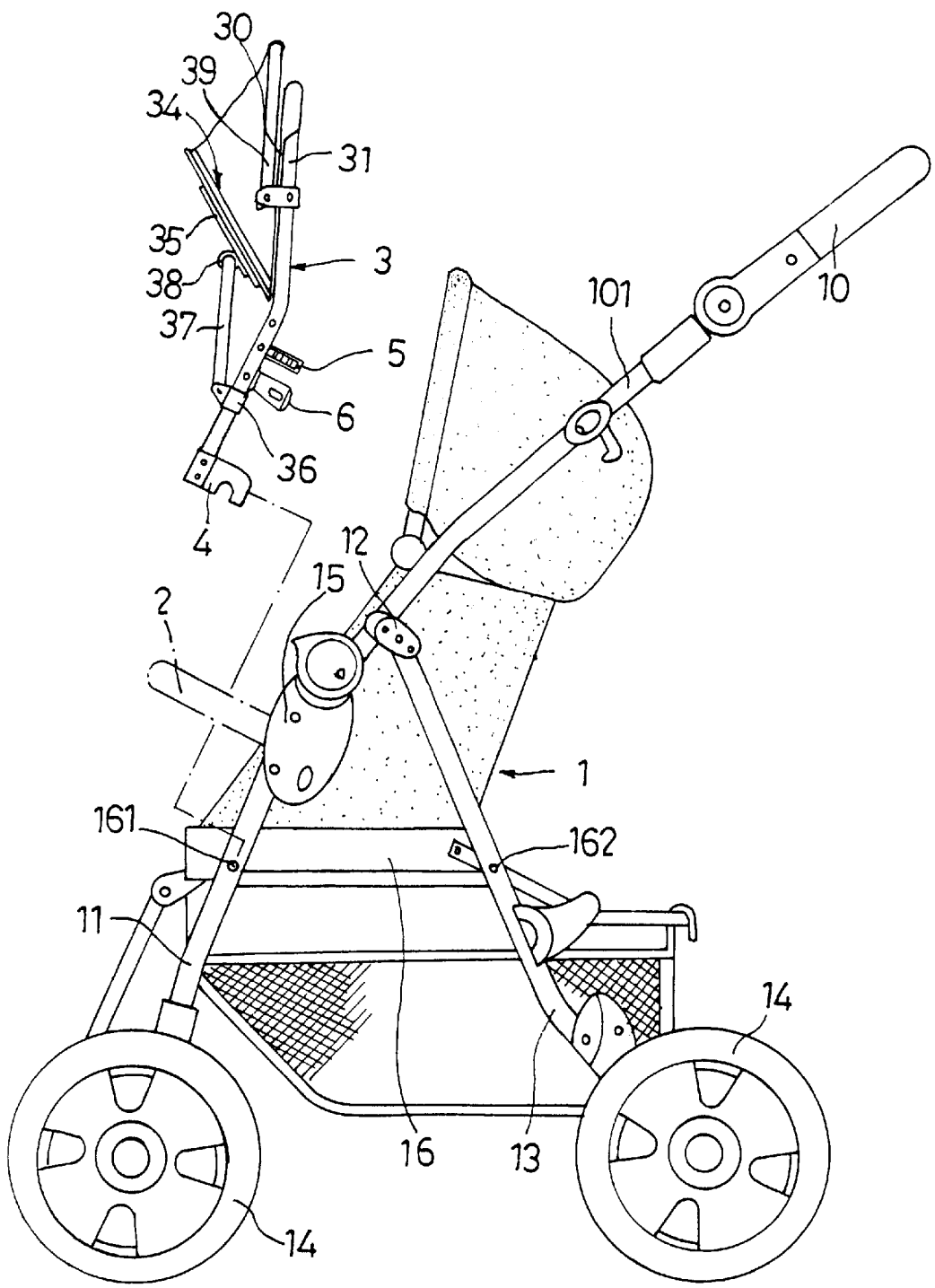
FIG. 1 is a partly exploded side view of a preferred embodiment of a stroller according to the present invention.

Referring to FIG. 1, the stroller of the preferred embodiment according to the present invention is shown to include a main frame 1, an auxiliary seat unit 3, a guard frame 2, a mounting unit 5, a hooking unit 4 and a retaining unit 6. The main frame 1 includes a seat portion 16, a handle 10 with a parallel pair of connecting sections 101(only one connecting section 101 is shown), a parallel pair of downwardly and forwardly extending front leg portions 11 (only one front leg portion 11 is shown) which are disposed adjacent to two lateral sides of the seat portion 16, a parallel pair of downwardly and rearwardly extending rear leg portions 13 which are disposed adjacent to the lateral sides of the seat portion 16, a pair of connecting seats 15(only one connecting seat 15 is shown) for connecting the front leg portions 11 to the connecting sections 101 of the handle 10, and a pair of pivot units 12 (only one pivot units 12 is shown) for connecting the rear leg portions 13 to the connecting sections 101 of the handle 10. Each of the front and rear leg portions 11, 13 has a bottom end provided with a wheel 14. Each of the front leg portions 11 is mounted to the seat portion 16 by means of a front fastening member 161. Each of the rear leg portions 13 is mounted to the seat portion 16 by means of a rear fastening member 162.

Figure 3:
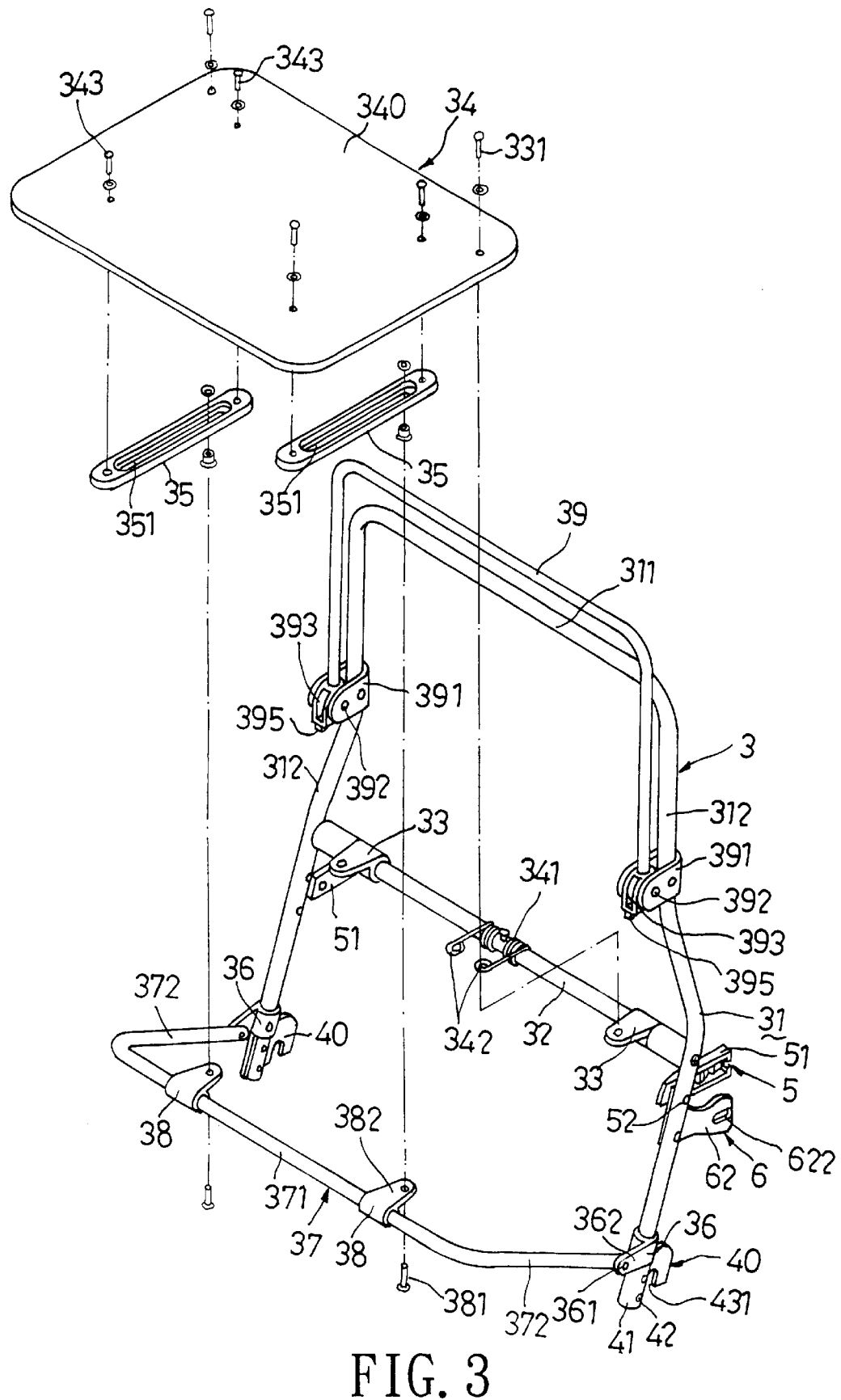
FIG. 3 is an exploded perspective view illustrating an auxiliary frame of the stroller of the preferred embodiment.

Referring to FIGS. 1 and 3, the auxiliary seat unit 3 is to be mounted on a front side of the main frame 1, and generally includes an auxiliary frame 31, a seat portion 34, and a support frame member 37.

The auxiliary frame 31 includes a horizontal top bar 311, a pair of upright mounting posts 312 extending downwardly from the top bar 311, and a connecting rod 32 extending transversely between the mounting posts 312 to interconnect the same. An upper section of each of the mounting posts 312 is provided with a pivot seat 391. A pair of pivot sleeves 33 are sleeved rotatably on the connecting rod 32. A biasing member 341, which is in the form of a torsion spring, is provided on the connecting rod 32 between the pivot sleeves 33.

The seat portion 34 includes a seat board 340 which has a rear part resting on the connecting rod 32 and fastened to the pivot sleeves 33 by means of a pair of rivets 331 so as to be pivotable about the connecting rod 32. The biasing member 341 has two legs 342 abutting against a bottom side of the seat board 340 so as to bias a front part of the seat board 340 upwardly. A parallel pair of rail members 35 are fastened on the bottom side of the seat board 340 by means of rivets 343. Each of the rail members 35 is formed with a guiding groove 351 which extends from the front part to the rear part of the seat board 340.

The support frame member 37 is generally U-shaped, and has a slide arm section 371 and an opposite pair of pivot arm sections 372 extending rearwardly and downwardly from the slide arm section 371. The slide arm section 371 has a pair of coupling members 38 secured thereon. Each of the coupling members 38 has a flange portion 382. A pin 381 extends through the flange portion 382 of a respective one of the coupling members 38 and into the guiding groove 351 of a respective one of the rail members 35 to engage the same. The pins 381 are slidable along the guiding grooves 351. A pair of slide sleeves 36 are sleeved slidably and respectively on the lower sections of the mounting posts 312. Each of the slide sleeves 36 has a pivot lobe 362. Each of the pivot arm sections 372 of the support frame member 37 has a lower end mounted pivotally on the pivot lobe 362 of a respective one of the slide sleeves 36 by means of a horizontal pivot shaft 361.

A cushion 30 is provided on the seat board 34, the top bar 311 and on the upper sections of the mounting posts 312 for cushioning a baby seated on the seat portion 34.

The auxiliary seat unit 3 further includes a U-shaped guard member 39 which has two opposite end portions provided with pivot connectors 393 that are mounted pivotally on the pivot seats 391 of the mounting posts 312 by means of a pair of horizontal pivot shafts 392. Each of the pivot connectors 393 is formed with a wedge-shaped stop 395. The stops 395 abut against the mounting posts 312 when the guard member 39 pivots downwardly and forwardly relative to the mounting posts 312 so as to retain the guard member 39 at a predetermined angular position relative to the mounting posts 312, e.g. to retain the guard member 39 at a horizontal position.

Figure 4:
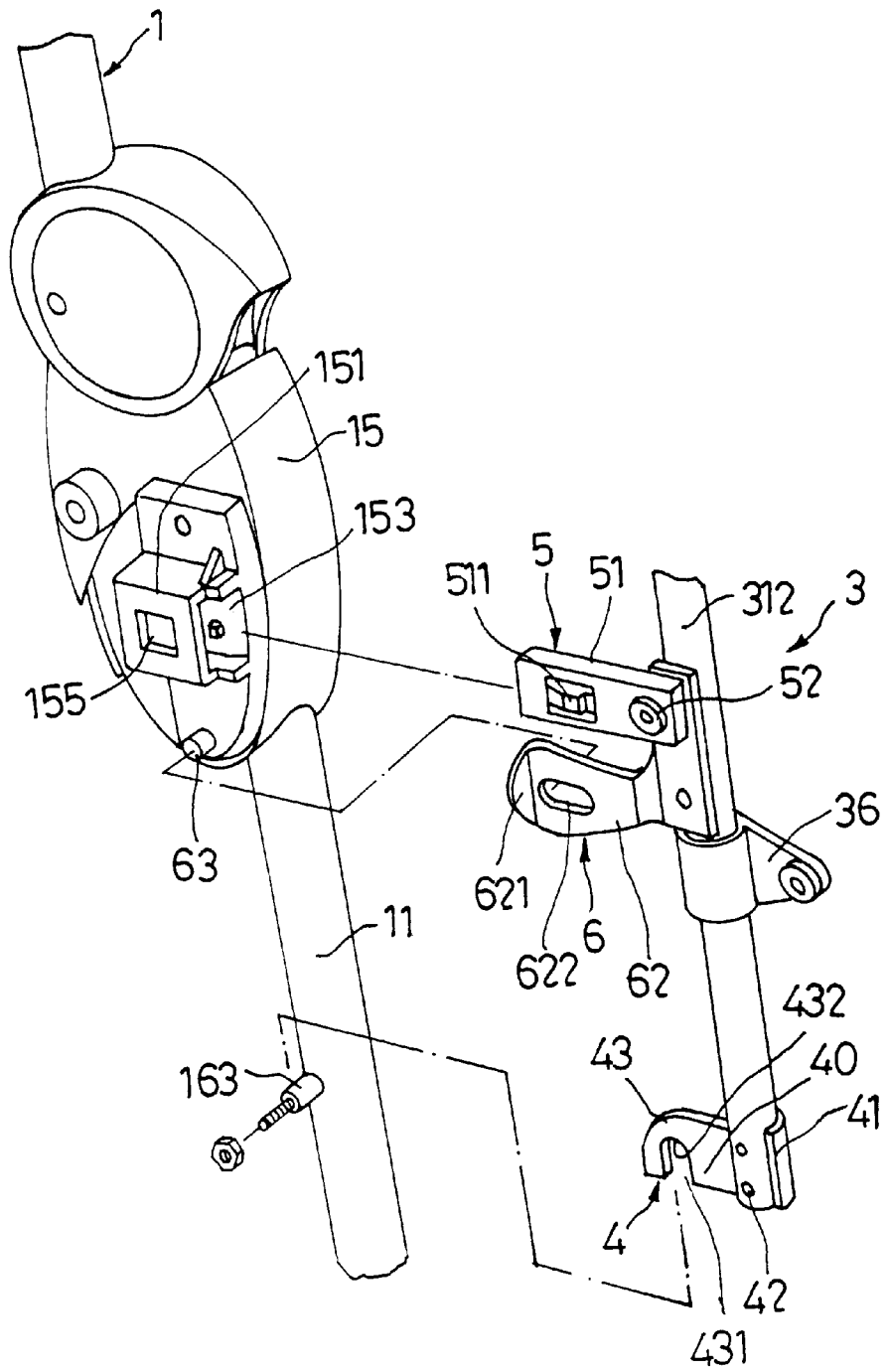
FIG. 4 is another enlarged fragmentary exploded perspective view of the stroller of the preferred embodiment.

Referring to FIG. 4, the locking unit 5 includes a pair of hollow locking seats 151 formed on inner sides of the connecting seats 15, and a pair of first insert members 51 mounted pivotally and held frictionally on the mounting posts 312 of the auxiliary frame 31 by means of a pair of pivot pins 52. Each of the locking seats 151 is formed with an insert hole 153 which opens forwardly, and has a side wall formed with a locking opening 155 communicated with the insert hole 153. Each of the first insert members 51 is insertable into the insert hole 153 of a respective one of the locking seats 151, and is formed with a resilient locking protrusion 511 which extends through and which engages the locking opening 155 when the first insert member 51 is inserted into the respective locking seat 151, thereby preventing undesired removal of first insert members 51 from the locking seats 151. The auxiliary seat unit 3 can thus be mounted on the front side of the main frame 1. The locking protrusions 511 are depressible for retraction into the locking seats 151 to permit release of the first insert members 51 from the locking seats 151.

The retaining unit 6 includes a retaining stud 63 formed on the inner side of one of the connecting seats 15 below the locking seat 151, and a resilient retaining plate 62 mounted on one of the mounting posts 312 of the auxiliary frame 31. The retaining stud 63 projects inwardly toward an opposite one of the front leg portions 11. The retaining plate 62 extends rearwardly from said one of the mounting posts 312, and is formed with a retaining hole 622 for engaging the retaining stud 63. The retaining plate 62 further has a folded distal end portion 621 which extends inwardly toward the opposite one of the front leg portions 11 and which enables the retaining stud 63 to slide into and engage the retaining hole 622 when the first insert members 51 are inserted into the insert holes 153 of the locking seats 151.

The hooking unit 4 includes a pair of hooking plates 40 (see FIG. 3) mounted respectively on bottom ends of the mounting posts 312, and a pair of support rods 163 provided on the front fastening members 161 of the main frame 1 and extending between the front leg portions 11 and adjacent lateral sides of the seat portion 16 (see FIG. 1). Each of the hooking plates 40 has a mounting end 41 mounted on a respective one of the mounting posts 312 by rivets 42, and a hooking end 43 projecting rearwardly from the respective mounting post 312 and formed with an engaging groove 431 that opens downwardly. Each of the support rods 163 has a circular circumference. The engaging groove 431 of each of the hooking plates 40 has a curved groove-defining edge 432 that complements the circumference of a respective one of the support rods 163. Therefore, the mounting posts 312 are pivotable about an axis of the support rods 163 to facilitate insertion of the first insert members 51 into the insert holes 153. The support rods 163 cooperatively serve as a support for supporting the auxiliary seat unit 3 when the first insert members 51 move toward the locking seats 151 for engaging the same.

Figure 6:
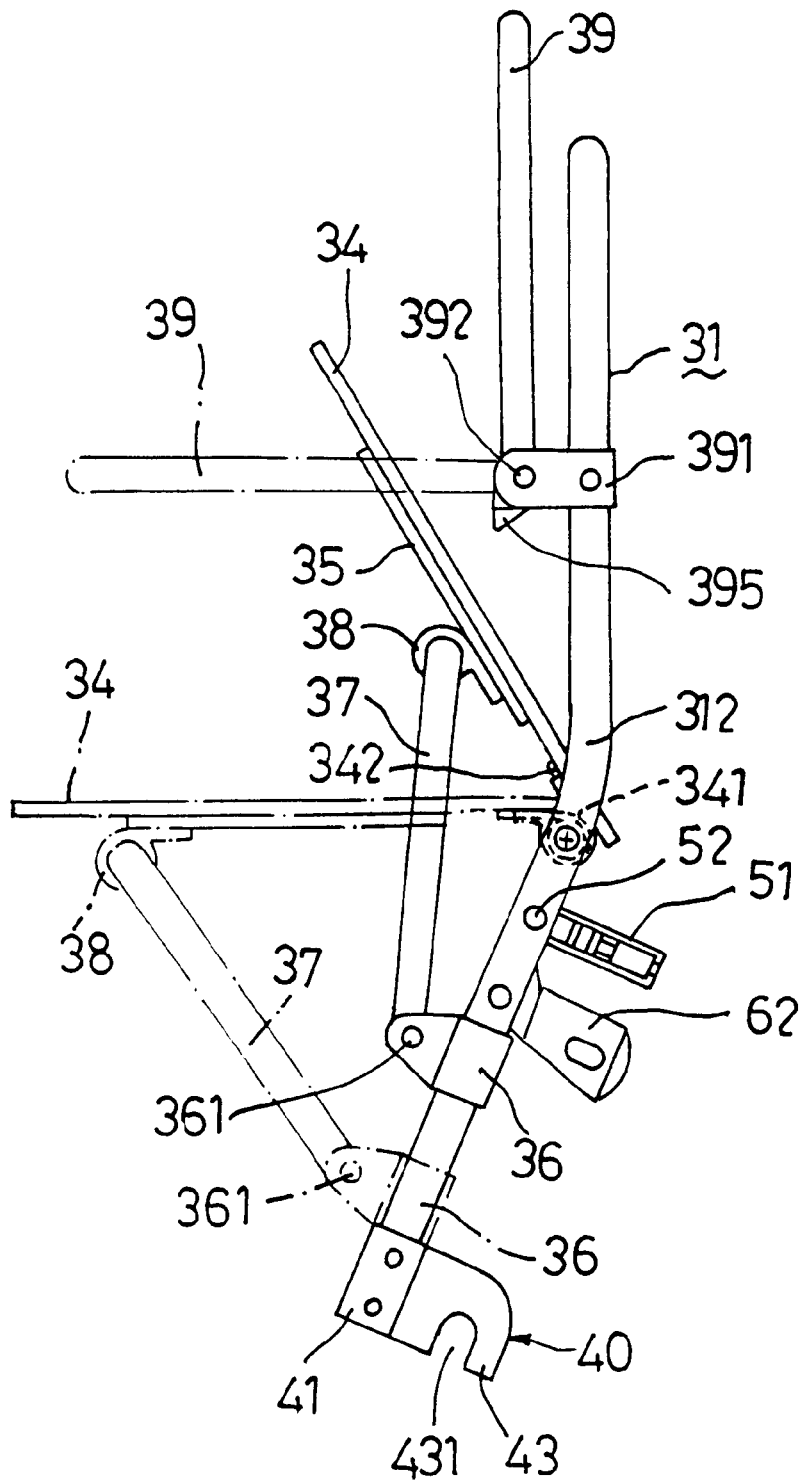
FIG. 6 is a side view of an auxiliary frame of the present invention, illustrating how the auxiliary frame can be folded.

Referring to FIGS. 3 and 6, the pair of slide sleeves 36 are disposed between the hooking plates 40 and the first insert members 51 on the mounting posts 312 of the auxiliary frame 31. Therefore, when the front part of the seat board 34 is biased upwardly by the biasing member 341, the slide arm section 371 of the support frame member 37 slides on the bottom side of the seat board 34 from the front part toward the rear part, and the pivot arm sections 372 pivot toward the mounting posts 312 about an axis of the pivot shafts 361. At the same time, the slide sleeves 36 move upwardly along the mounting posts 312 to move the seat board 340 closer to the mounting posts 312.

Figure 2:
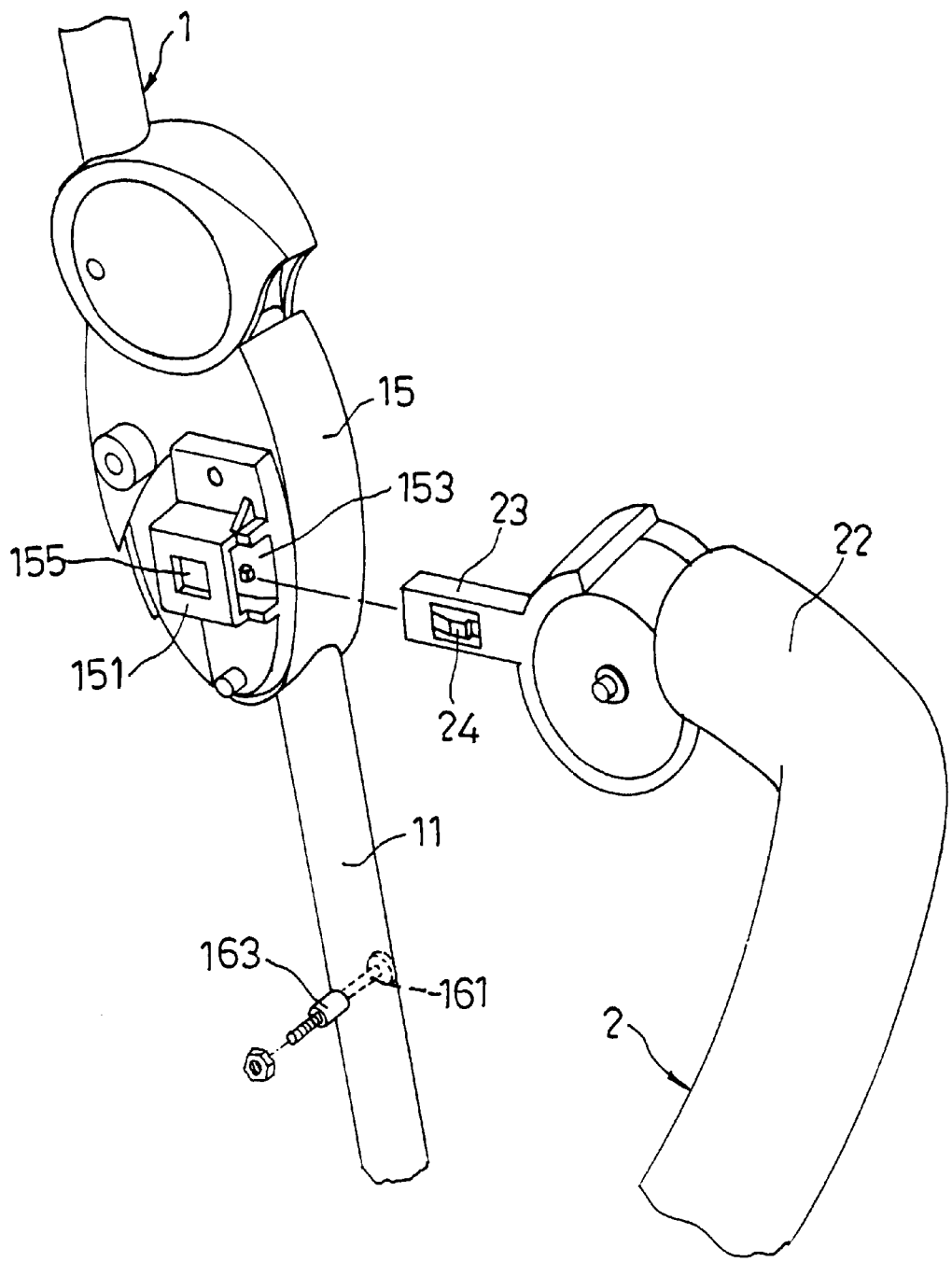
FIG. 2 is an enlarged fragmentary exploded perspective view of the stroller of the preferred embodiment.

Referring again to FIGS. 1 and 2, the guard frame 2 is mounted on a front side of the main frame 1 to protect a baby seated on the seat portion 16 when the auxiliary seat unit 3 is detached from the main frame 1. The guard frame 2 is generally U-shaped and has two opposite end portions 22, each of which is provided with a second insert member 23 that is also insertable into the insert hole 153 of a respective one of the locking seats 151. The second insert member 23 is also formed with a resilient locking protrusion 24 which extends through and which engages the locking opening 155 when the second insert member 23 is inserted into the insert hole 153, thereby preventing undesired removal of the second insert member 23 from the locking seat 151. The locking protrusions 24 are depressible to permit release of the second insert members 23 from the locking seats 151, thereby permitting detachment of the guard frame 2 from the main frame 1.

In the case that only one baby is to be seated on the stroller, the guard frame 2 is mounted on the front side of the main frame 1 by inserting the second insert members 23 from the front side rearwardly into the insert holes 153 of the locking seats 151, and by allowing the locking protrusions 24 to engage the locking openings 155. The guard frame 2 serves to protect the baby seated on the seat portion 16.

Figure 5:
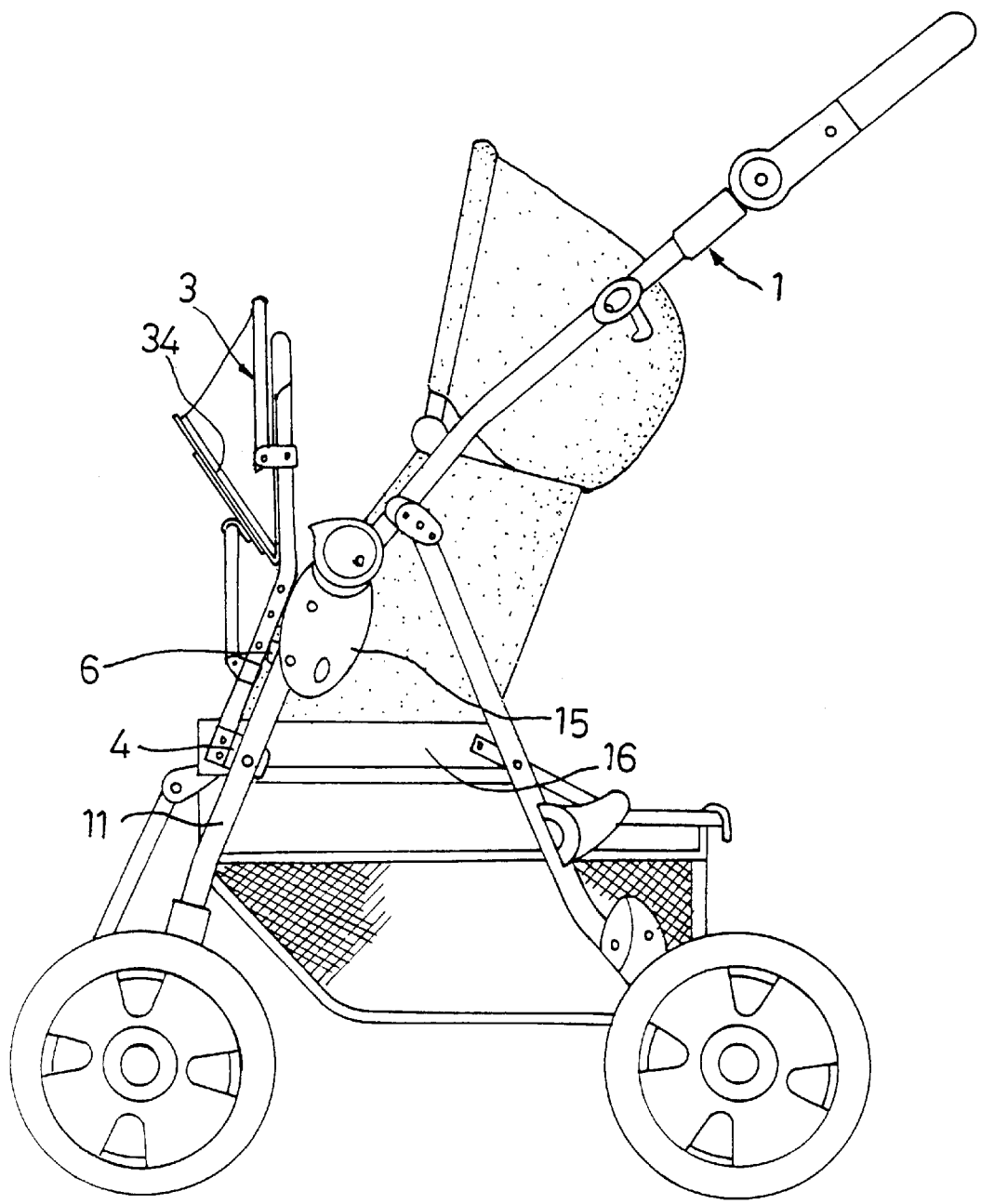
FIG. 5 is a side view of the stroller of the preferred embodiment, in a state where an additional seat is provided.

When it is desired to provide an additional seat for seating another baby thereon, the guard frame 2 is detached from the main frame 1 by depressing the locking protrusions 24 to permit the release of the second insert members 23 from the locking seats 151. Thereafter, as shown in FIGS. 4 and 5, the auxiliary seat unit 3 is mounted on the front side of the main frame 1 as follows: The hooking plates 43 are hooked on the support rods 163. The mounting posts 312 of the auxiliary frame 31 are subsequently pivoted rearwardly about an axis of the support rods 163 toward the main frame 1 such that the first insert members 51 are inserted into the insert holes 153 to allow the locking protrusions 511 to engage the locking openings 155 and such that the retaining stud 63 engages the retaining hole 622 of the retaining plate 62. The support rods 163 help to support the combined weight of the auxiliary seat unit 3 and the baby seated thereon.

Referring back to FIGS. 3 and 6, to seat the baby on the seat portion 34 of the auxiliary seat unit 3, the front part of the seat board 340 is pressed downwardly against the biasing force of the biasing member 341. At this time, the slide arm section 371 of the support frame member 37 moves along the rail members 35 to the front part of the seat board 34, the pivot arm sections 372 pivot forwardly about the pivot shafts 361, and the slide sleeves 36 slide downwardly to abut against the mounting ends 41 of the hooking plates 43. The guard member 39 is turned forwardly about the pivot shafts 392 until the stops 395 abut against the mounting posts 312. The guard member 39 is thus retained releasably at the horizontal position. The baby can be seated on the seat portion 34 from above the auxiliary seat unit 3.

Referring once again to FIGS. 4 and 5, when the additional seat provided by the auxiliary seat unit 3 becomes unnecessary, the auxiliary seat unit 3 can be detached from the main frame 1 as follows: The locking protrusions 511 are depressed for retraction into the locking seats 151 to permit release of the first insert members 51 from the locking seats 151. At the same time, the folded end portion 621 of the retaining plate 62 is pulled inwardly to disengage the retaining stud 63 from the retaining hole 622. The mounting posts 312 are then pivoted forwardly about the axis of the support rods 163 for removal of the auxiliary frame 31 from the main frame 1.

In the present embodiment, the locking seats 151 are provided on the front leg portions 11 of the main frame 1, while the first and second insert members 51, 23 are respectively provided on the auxiliary frame 31 and the guard frame 2. However, the stroller of the present invention is not limited to the illustrated embodiment. In other embodiments, the locking seats may be formed on the auxiliary frame and on the guard frame, while the insert members may be formed on the main frame.

According to the present invention, an additional seat can be easily provided on the stroller and can be detached from the stroller as desired in a simple and quick manner. The stroller of the present invention does not occupy as much space as a conventional twin-seat stroller.

While the present invention has been described in connection with what is considered the most practical and preferred embodiment, it is understood that this invention is not limited to the disclosed embodiment but is intended to cover various arrangements included within the spirit and scope of the broadest interpretation so as to encompass all such modifications and equivalent arrangements.

I claim:

1. A stroller comprising:

a main frame including a first seat portion with two lateral sides, a parallel pair of forwardly and downwardly extending wheeled front leg portions, and a parallel pair of rearwardly and downwardly extending wheeled rear leg portions, said front and rear leg portions being disposed adjacent to said lateral sides of said first seat portion and being mounted to said first seat portion;

an auxiliary seat unit including an auxiliary frame and a second seat portion mounted on said auxiliary frame;

a mounting unit for mounting detachably said auxiliary frame on said main frame in front of said first seat portion, including a locking seat provided on one of said main frame and said auxiliary frame, and a first insert member provided on the other one of said main frame and said auxiliary frame, said locking seat being formed with an insert hole which permits insertion of said first insert member thereinto for engaging releasably said first insert member; and a hooking unit which includes a support provided on said main frame and a hook provided on said auxiliary frame for hooking at said support such that said auxiliary frame can be hooked on said main frame in order to support said auxiliary seat unit when said first insert member engages said locking seat.

2. The stroller according to claim 1, wherein said first insert member has a resilient locking protrusion, and said locking seat is formed with a locking opening communicated with said insert hole, said locking protrusion extending through and engaging said locking opening to prevent undesired removal of said first insert member from said locking seat and being depressible for retraction into said locking seat to permit removal of said first insert member from said locking seat.

3. The stroller according to claim 1, wherein said support of said hooking unit includes a pair of horizontal support rods which are aligned with each other and which extend between said front leg portions and adjacent ones of said lateral sides of said first seat portion, respectively, said auxiliary frame including a pair of downwardly extending upright mounting posts having bottom ends, said hook including a pair of hooking plates mounted on and projecting rearwardly from said bottom ends of said mounting posts, each of said hooking plates being formed with an engaging groove that opens downwardly and that permits extension of a respective one of said support rods thereinto, said hooking plates engaging said support rods so as to support said auxiliary frame on said main frame when said first insert member is inserted into said insert hole of said locking seat.

4. The stroller according to claim 3, wherein each of said support rods has a circular circumference, said engaging grooves of said support plates complementing said support rods, said auxiliary frame being pivotable rearwardly and forwardly about an axis of said support rods during extension and removal of said first insert member into and from said insert hole of said insert seat.

5. The stroller according to claim 1, wherein a pair of said locking seats are provided on said front leg portions of said main frame, said auxiliary frame including a pair of downwardly extending upright mounting posts provided with a pair of said first insert members.

6. The stroller according to claim 5, further comprising a U-shaped guard frame with opposite end portions, each of said end portions being provided with a second insert member that is insertable into said insert hole of a respective one of said locking seats for engaging releasably the respective one of said locking seats so as to permit mounting of said guard frame in front of said main frame when said auxiliary frame is detached from said main frame.

7. The stroller according to claim 5, further comprising a retaining unit which includes a retaining stud provided on one of said front leg portions, and a retaining plate mounted on one of said mounting posts of said auxiliary frame, said retaining plate extending rearwardly from said auxiliary frame and being formed with a retaining hole for engaging said retaining stud when said first insert members are inserted into said locking seats.

8. The stroller according to claim 1, wherein said auxiliary frame includes:

a pair of downwardly extending upright mounting posts;

a horizontal connecting rod which extends between said mounting posts for interconnecting said mounting posts;

a seat board which has a rear part resting and mounted pivotally on said connecting rod, a front part, and a bottom side provided with a rail member that is formed with a guiding groove which extends from said front part to said rear part;

a biasing member mounted on said connecting rod for biasing said seat board to pivot upwardly and rearwardly about said connecting rod; and a support frame member having a lower end mounted pivotally on said mounting posts, and an upper end provided with a pin which engages slidably said guiding groove for sliding along said guiding groove when said seat board pivots rearwardly about said connecting rod.

9. The stroller according to claim 8, wherein said support frame member includes a slide arm section at said upper end, and aparallel pair of pivot arm sections which extend rearwardly and downwardly from said slide arm section, said slide arm section being provided with said pin for coupling slidably with said seat board, said auxiliary frame further including a pair of slide sleeves which are sleeved slidably and respectively on said mounting posts of said auxiliary frame, each of said pivot arm portions of said support frame member having a lower end mounted pivotally on a respective one of said slide sleeves.

10. The stroller according to claim 8, wherein said auxiliary seat unit further includes a U-shaped guard member which has two opposite end portions mounted pivotally and respectively on said mounting posts above said seat portion such that said guard member is pivotable rearwardly and upwardly relative to said mounting posts, each of said end portions being provided with a stop which abuts against a respective one of said mounting posts for releasable retention of said guard member at a predetermined angular position relative to said mounting posts.

* * * * *